United States Patent Office 2,723,298
Patented Nov. 8, 1955

2,723,298

ALKYLATION PROCESS FOR THE PREPARATION OF ALKYLCYCLOHEXANES AND DECALINS

Abraham Schneider, Philadelphia, Pa., assignor to Sun Oil Company, Philadelphia, Pa., a corporation of New Jersey No Drawing. Application October 16, 1952, Serial No. 315,193

9 Claims. (Cl. 260—666)

This invention relates to an alkylation process, and more specifically relates to a process for the alkylation of cyclo-olefins with isoparaffins and the simultaneous self-alkylation of the cyclo-olefin.

Processes for the alkylation of olefins with isoparaffins using a variety of catalysts have heretofore been described. In such processes the alkylation of the olefin with the isoparaffin is the desired reaction and special precautions are employed in order to prevent polymerization of the olefin to high molecular weight unsaturated materials such as tars and resins.

It has now been found that by using specific reactants under correlated reaction conditions, simultaneous reactions whereby isoparaffins alkylate cyclo-olefins to produce alkylcyclohexanes and cyclo-olefins self-alkylate to produce decalins can be made to occur. In the process, the alkylation product of the cyclo-olefin with the isoparaffin and the self-alkylation product of the cyclo-olefin, alkylcyclohexanes and decalins, respectively, are the sole principal products, and only a minor quantity, if any, of the reactants are converted to high molecular weight unsaturated materials.

To illustrate the process of the present invention, cyclopentene is added to a stirred mixture of isobutane and hydrogen fluoride at a temperature of about 25° C. A clean cut reaction rapidly occurs in which a mixture of trimethylcyclohexanes and decalin are formed as the principal products. Thus instead of polymerization of the olefin, self-alkylation is obtained to form, instead of high molecular weight unsaturated materials, the saturated self-alkylation product of the olefin. By the expression "self-alkylation," and terms of similar import as used herein, is meant the union of two molecules of the same material, here the cyclopentene, to form a saturated product having a number of carbon atoms equal to the sum of the number of carbon atoms of the two molecules forming the product.

The cyclo-olefin employed must be a cyclopentene having from 5 to 10 carbon atoms and not more than two alkyl substituents per molecule. Cyclopentene is the preferred cyclo-olefin, but other cyclopentenes within the foregoing definition may be employed, such as methylcyclopentene, ethylcyclopentene, dimethylcyclopentene, methylethylcyclopentene, and ethylpropylcyclopentene. When using an alkylcyclopentene, it is immaterial whether the alkyl group or groups be attached to saturated or unsaturated carbon atoms of the cyclopentene, and hence for example, "methylcyclopentene," as used herein, is meant to include methylcyclopentenes having the methyl group attached to either a saturated or an unsaturated carbon atom, or mixtures of both.

The isoparaffin to employ must have from 4 to 10 carbon atoms and at least 1 tertiary hydrogen atom per molecule. By "tertiary hydrogen atom" is meant a hydrogen atom which is attached to a tertiary carbon atom. Isobutane is the preferred isoparaffin, but other isoparaffins within the foregoing definition may be used, such as isopentane, 2-methylpentane, 3-methylpentane, and the isoheptanes, iso-octanes, and isodecanes.

It is characteristic of the present process that the alkylation product of the cyclo-olefin and isoparaffin contains the same number of carbon atoms as the sum of the reactants, and that the self-alkylation product of the cyclo-olefin likewise contains the same number of carbon atoms as two molecules of the olefin. For example, using cyclopentene and isobutane, trimethylcyclohexanes and decalin are the principal products; using methylcyclopentene and isobutane, dimethylethylcyclohexanes, tetramethylcyclohexanes and dimethyl decalins are the products; using cyclopentene and isopentane, dimethylethylcyclohexanes, tetramethylcyclohexanes and decalin are the products.

An advantage of the present process is the self-alkylation of the cyclo-olefin to form valuable decalins instead of being converted to high molecular weight unsaturated products. Decalin, which is the usual name applied to decahydronaphthalene, is in demand as a substitute for turpentine in the paint and varnish industry, in the manufacture of cosmetics, as a solvent in processing fats and oils, and the like, and the alkyl decalins such as methyldecalins which may be prepared in the present process have like uses. The polyalkylcyclohexanes prepared in the present process likewise have a variety of uses, such as chemical intermediates in the preparation of resins, as solvents, and the like.

In carrying out the process of the present invention, it is preferred to employ an excess of isoparaffin. A mole ratio of isoparaffin to cyclo-olefin of from 2:1 to 10:1 or more may be employed, but preferably the mole ratio is from 3:1 to 5:1. The quantity of HF to employ is not critical and may be varied from about 50 to 500% by weight based on the hydrocarbons employed. The temperature of the reaction mixture should be maintained in the range of from —20 to 70° C., and preferably is maintained within the range of from 10 to 50° C. In the lower temperature range, formation of the alkylation product between the olefin and isoparaffin appears to be favored, whereas the temperatures in the upper portion of the range, formation of the self-alkylation product of the olefin appears to be favored. The present reaction is carried out in liquid phase and the pressure is that which is necessary to maintain the components of reaction and catalyst in the liquid phase, but higher pressures may be employed if desired. Under usual conditions of operation, the pressure will be from about 25 to 500 p. s. i. g.

In carrying out the present process it is preferred to introduce the cyclo-olefin into an emulsion of the isoparaffin and hydrogen fluoride, but other methods such as the introduction of a mixture of the cyclo-olefin and isoparaffin into hydrogen fluoride, or the simultaneous but separate introduction thereof into hydrogen fluoride, may be employed.

The time of reaction is not considered critical, and under the usual conditions of operation may be varied from about one minute to one hour.

The following example illustrates the process of the present invention in which "parts" refers to parts by weight.

To a stirred mixture of 304 parts of hydrogen fluoride and 352 parts of isobutane was added 100 parts of cyclopentene over a period of from 5 to 10 minutes at an initial temperature of about 24° C. The reaction mixture warmed to about 30° C. during the addition. The mixture was stirred for about 30 minutes, cooled to about 0° C. and the acid layer separated by decanting.

The components of the organic layer were separated by distillation, and some loss of products during mechanical manipulations was observed. There were recovered 272 parts of isobutane, 83.5 parts of trimethylcyclohexanes and 12 parts of decalin. The trimethylcyclohexanes consisted principally of 1,2,4-trimethylcyclohexane, with smaller but substantial quantities of 1,2,3-trimethylcyclohexane and 1,3,5 - trimethylcyclohexane. The decalin product contained about 60% of the cis-isomer, the remainder being substantially the trans-isomer. Other products obtained included about 10 parts of octanes from the self-alkylation of isobutane and a small quantity, less than 9 parts, of high boiling materials.

The foregoing example is presented to illustrate the present process. Where other materials and reaction conditions within the limits herein described are employed, substantially equivalent results are obtained. It is not permissible to substitute other materials for the cyclopentenes. Cyclohexenes, for example, are inoperative in that substantially no yield of decalin is obtained, and considerable conversion of the reactants to high boiling materials is observed. It is permissible, especially where it is desired to operate the process at a relatively low temperature, to employ a minor quantity of boron trifluoride together with the hydrogen fluoride. When so employed, the quantity of boron trifluoride should be maintained within the range of from about 0.5 to 10% by weight based on the quantity of hydrogen fluoride employed.

The invention claimed is:

1. Process for the simultaneous preparation of alkylcyclohexanes and decalins which comprises reacting in the liquid phase at a temperature of from —20° C. to 70° C. a cyclopentene having from 5 to 10 carbon atoms and an isoparaffin having from 4 to 10 carbon atoms in the presence of a catalyst consisting essentially of hydrogen fluoride, whereby the isoparaffin alkylates the cyclopentene to form alkylcyclohexanes and the cyclopentene self-alkylates to form a decalin, and separating the so-formed alkyl cyclohexanes and decalin from the reaction mixture.

2. Process according to claim 1 wherein the cyclopentene selected is cyclopentene.

3. Process according to claim 1 wherein the cyclopentene selected is methylcyclopentene.

4. Process according to claim 1 wherein the cyclopentene selected is dimethylcyclopentene.

5. Process according to claim 1 wherein the cyclopentene selected is methylethylcyclopentene.

6. Process according to claim 1 wherein the isoparaffin selected is isobutane.

7. Process according to claim 1 wherein the isoparaffin selected is isopentane.

8. Process for the simultaneous preparation of trimethylcyclohexanes and decalin which comprises reacting in the liquid phase at a temperature of from —20° C. to 70° C. cyclopentene with isobutane in the presence of a catalyst consisting essentially of hydrogen fluoride, and separating trimethylcyclohexanes and decalin from the reaction mixture.

9. Process for the simultaneous preparation of alkylcyclohexanes and decalins which comprises reacting in the liquid phase at a temperature of from —20° C. to 70° C. a cyclopentene having from 5 to 10 carbon atoms and an isoparaffin having from 4 to 6 carbon atoms in the presence of a catalyst consisting essentially of hydrogen fluoride and boron trifluoride, the quantity of boron trifluoride being from 0.5% to 10% by weight based on the hydrogen fluoride, whereby the isoparaffin alkylates the cyclopentene to form alkylcyclohexanes and the cyclopentene self-alkylates to form a decalin.

References Cited in the file of this patent

UNITED STATES PATENTS

| | | |
|---|---|---|
| 2,315,078 | Pines et al. | Mar. 30, 1943 |
| 2,317,901 | Frey | Apr. 27, 1943 |
| 2,322,800 | Frey | June 29, 1943 |
| 2,340,557 | Pines et al. | Feb. 1, 1944 |
| 2,385,300 | Pines et al. | Sept. 18, 1945 |